United States Patent
Afman

(10) Patent No.: US 11,334,079 B2
(45) Date of Patent: May 17, 2022

(54) WATERCRAFT AND WATERCRAFT CONTROL SYSTEM

(71) Applicant: YAMAHA HATSUDOKI KABUSHIKI KAISHA, Shizuoka (JP)

(72) Inventor: Juan Pablo Afman, Kennesaw, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/830,793

(22) Filed: Mar. 26, 2020

(65) Prior Publication Data

US 2021/0302965 A1   Sep. 30, 2021

(51) Int. Cl.
| | |
|---|---|
| G05D 1/02 | (2020.01) |
| G05D 1/00 | (2006.01) |
| B63H 25/04 | (2006.01) |
| B63H 25/42 | (2006.01) |

(52) U.S. Cl.
CPC ......... *G05D 1/0206* (2013.01); *G05D 1/0094* (2013.01); *B63H 25/04* (2013.01); *B63H 25/42* (2013.01)

(58) Field of Classification Search
CPC .......... G05D 1/00; G05D 1/02; G05D 1/0206; G05D 1/0225; G05D 1/0094; B63H 25/00; B63H 25/04; B63H 25/42
USPC .......................................................... 440/1
See application file for complete search history.

(56) References Cited

U.S. PATENT DOCUMENTS

| | | |
|---|---|---|
| 2018/0004209 A1 | 1/2018 | Akuzawa et al. |
| 2018/0046190 A1 | 2/2018 | Hitachi et al. |
| 2018/0057132 A1 | 3/2018 | Ward et al. |
| 2019/0361457 A1 | 11/2019 | Johnson et al. |

FOREIGN PATENT DOCUMENTS

| | | |
|---|---|---|
| JP | H09295600 A | 11/1997 |
| JP | H10147160 A | 6/1998 |
| JP | 2002090171 A | 3/2002 |
| JP | 2013103526 A | 5/2013 |
| JP | 2016162279 A | 9/2016 |
| JP | 2018001945 A | 1/2018 |
| WO | 2018123948 A1 | 7/2018 |

OTHER PUBLICATIONS

The extended search report of the corresponding European Patent Application No. 21155201.3, dated Jul. 27, 2021.

*Primary Examiner* — Lars A Olson
(74) *Attorney, Agent, or Firm* — Global IP Counselors, LLP

(57) ABSTRACT

A watercraft control system is configured to maintain a prescribed distance between a host watercraft and a stationary or anchored object. The watercraft control system can be integrated with a main watercraft control system of the host watercraft, or can be an add-on watercraft control system that supplements the main watercraft control system of the host watercraft. The watercraft control system basically includes a detector and a digital controller. The detector is configured to detect a stationary or anchored object spaced from a host watercraft. The digital controller is configured to communicate with the detector to receive a detection signal from the detector. The digital controller is configured to output at least one control command to a propulsion unit of the host watercraft to maintain a prescribed distance between the host watercraft and the stationary or anchored object.

20 Claims, 9 Drawing Sheets

WATERCRAFT AND WATERCRAFT CONTROL SYSTEM

BACKGROUND

Technical Field

The present disclosure generally relates to the field of watercrafts. More particularly, the present disclosure relates to a watercraft that is configured to maintain a prescribed distance between the watercraft and a stationary or anchored object.

Background Information

Sometimes it is desirable to park a watercraft on the water so that the watercraft maintains a desired location in the water and does not move relative to the land. For example, the watercraft is often parked so that when the rider(s) wants to conduct ocean research, fish or swim off of the watercraft. Conventionally, parking a watercraft is accomplished by dropping overboard a heavy object that is attached to the watercraft by a rope or chain.

In more recent years, some watercrafts are provided with a station-keeping system holding a position of the watercraft in the water so that the watercraft does not moving relative to the land. These station-keeping system typically use multichannel satellite positioning data together with various sensors to maintain the watercraft at a particular location.

SUMMARY

Generally, the present disclosure is directed to various features of a watercraft such as an outboard motor boat, a personal watercraft, a jet boat, a pontoon boat, etc., or a watercraft control system that is configured to maintain a prescribed distance between a host watercraft and a stationary or anchored object.

It has been discovered that in certain circumstances a satellite signal is not available such that the station-keeping system cannot operate properly to maintain the watercraft at a particular location. For example, a satellite signal may not be available under a bridge where fishing often occurs. In such a case, it is desirable to have a control system that maintains the watercraft at a particular location when a satellite signal is not available.

In accordance with one aspect of the present disclosure, a watercraft is configured to maintain a prescribed distance between a host watercraft and a stationary or anchored object. The watercraft basically comprises a watercraft body, a propulsion unit, a detector and a digital controller. The propulsion unit is provided to the watercraft body. The detector is configured to detect a stationary or anchored object spaced from the watercraft. The digital controller is configured to communicate with the detector to receive a detection signal from the detector, the digital controller configured to output at least one control command to the propulsion unit to maintain a prescribed distance between the watercraft and the stationary or anchored object.

In accordance with another aspect of the present disclosure, a watercraft control system is provided that is configured to maintain a prescribed distance between a host watercraft and a stationary or anchored object. The watercraft control system integrated with a main watercraft control system of the host watercraft, or can be an add-on watercraft control system that supplements the main watercraft control system of the host watercraft. The watercraft control system basically includes a detector and a digital controller. The detector is configured to detect a stationary or anchored object spaced from a host watercraft. The digital controller is configured to communicate with the detector to receive a detection signal from the detector. The digital controller is configured to output at least one control command to a propulsion unit of the host watercraft to maintain a prescribed distance between the host watercraft and the stationary or anchored object.

Also other features, aspects and advantages of the disclosed watercraft and the disclosed watercraft control system will become apparent to those skilled in the field of the watercraft field from the following detailed description, which, taken in conjunction with the annexed drawings, discloses several illustrative embodiments of a watercraft and a watercraft control system with various features.

BRIEF DESCRIPTION OF THE DRAWINGS

Referring now to the attached drawings which form a part of this original disclosure, watercrafts are illustrated having a watercraft control system for maintaining a prescribed distance between the watercraft and a stationary or anchored object.

Figure 1:
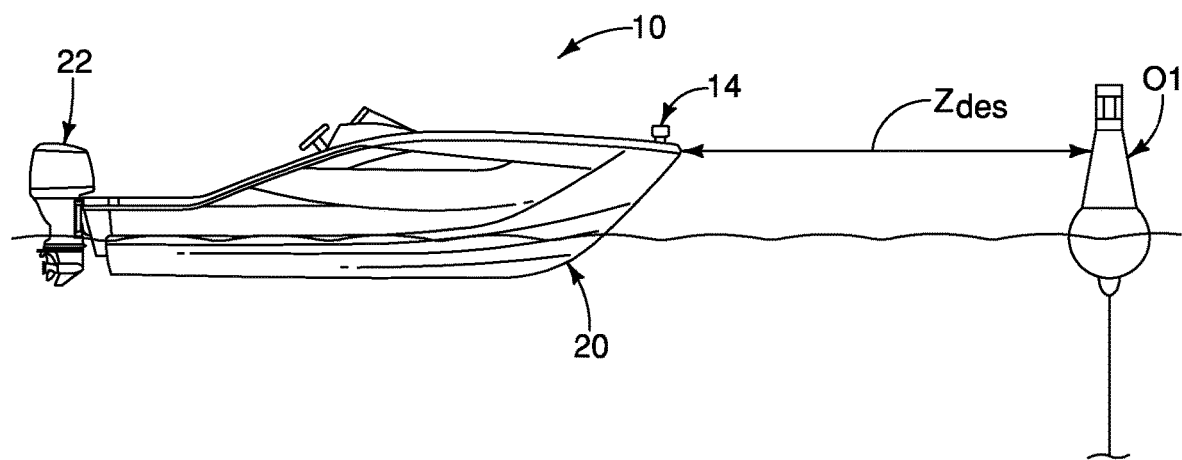
FIG. 1 is a side elevational view of a host watercraft equipped with a watercraft control system and a stationary or anchored object in which the host watercraft is maintained at a prescribed distance from the stationary or anchored object by the watercraft control system in accordance with the present disclosure.

It should be noted that these figures are intended to illustrate the general characteristics of methods, structures and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the watercraft field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Figure 2:
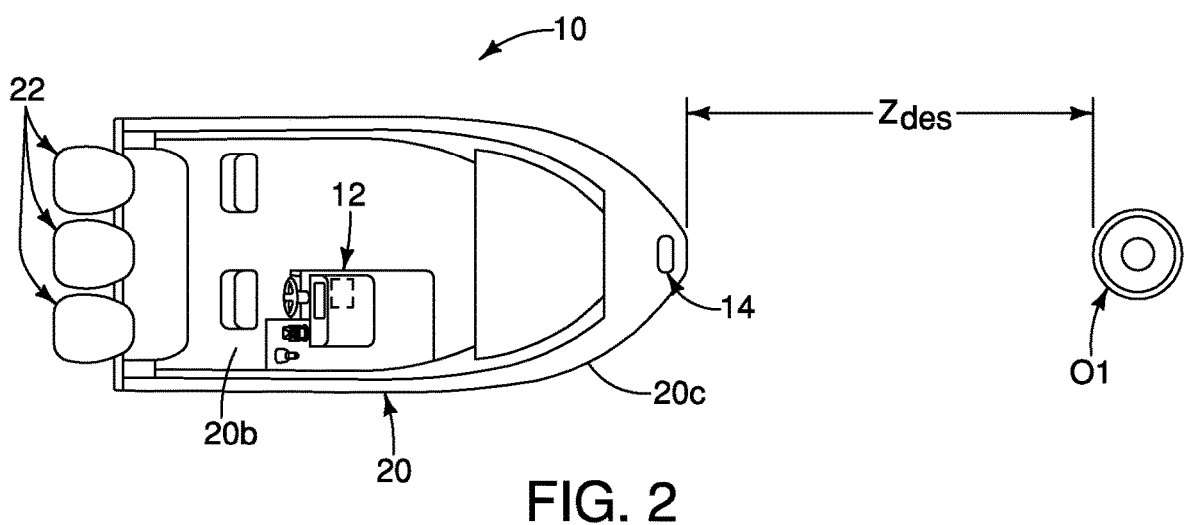
FIG. 2 is a top view of the host watercraft and the stationary or anchored object illustrated in FIG. 1.

Referring initially to FIGS. 1 and 2, a watercraft 10 is illustrated in accordance with a first embodiment. The watercraft 10 is configured to maintain a prescribed distance $Z_{des}$ between the watercraft 10 and a stationary or anchored object such as an anchored buoy O1 as seen in FIGS. 1 and 2. Preferably, the watercraft 10 is also configured to maintain a prescribed or desired orientation of the watercraft 10 with respect to the stationary or anchored object such as the anchored buoy O1 as seen in FIGS. 1 and 2.

More specifically, the watercraft 10 includes a watercraft control system 12 that is configured to automatically maintain a prescribed distance $Z_{des}$ from a stationary or anchored object as well as automatically maintain a prescribed or desired orientation of the watercraft 10 with respect to the stationary or anchored object once the driver or user selects the stationary or anchored object for carrying out a virtual anchoring mode. Thus, as explained later, the watercraft control system 12 can control the watercraft 10 so that the watercraft 10 is effectively anchored in the water without actually using an anchor or a satellite position signal from a satellite.

Basically, the watercraft control system 12 uses a stationary or anchored object as a reference point to maintain the watercraft 10 in a substantially stationary position by adjusting the propulsion system of the watercraft 10 to maintain a prescribed distance $Z_{des}$ with respect to the stationary or anchored object (e.g., the anchored buoy O1). The watercraft control system 12 can also maintain a desired orientation of the watercraft 10 uses the stationary or anchored object as a reference point by adjusting the propulsion system and/or the steering of the watercraft 10 as explained later. Thus, the terms "stationary object" and "anchored object" as used herein are considered to be synonymous and includes an object that may move a predetermined amount within the water. Thus, the stationary or anchored object can be the anchored buoy O1 illustrated in FIGS. 1 and 2, a bridge illustrated in FIG. 7, a floating dock that is anchored, a building on land, etc.

The watercraft control system 12 can be integrated with a main watercraft control system of the watercraft 10, or can be an add-on watercraft control system that supplements the main watercraft control system of the watercraft 10. In either case, the watercraft 10 is equipped with the watercraft control system 12 such that the watercraft 10 constitutes a host watercraft. As explained later, the virtual anchoring mode of the watercraft control system 12 includes a detector based virtual anchoring mode and a satellite based virtual anchoring mode. The detector based virtual anchoring mode is especially useful for situations in which a satellite signal that provides positioning information is not available to the watercraft 10 or unreliable. While the detector based virtual anchoring mode is mainly described as being used separately, it is possible for the watercraft 10 to use both the detector based virtual anchoring mode and the satellite based virtual anchoring mode to more precisely position the watercraft 10 at a desired location. Moreover, it is possible for the watercraft 10 manually switch between the detector based virtual anchoring mode and the satellite based virtual anchoring mode by a manual user input, or automatically switch between the detector based virtual anchoring mode and the satellite based virtual anchoring mode based on a prescribed condition.

Here, in the first embodiment, the watercraft control system 12 of the watercraft 10 includes an onboard detector 14 that is configured to detect the stationary or anchored object spaced from the watercraft 10. Preferably, the detector 14 includes an image recognition device as shown in the first embodiment. However, the detector 14 can include optical sensors such as one or more cameras, and/or one or more camera active sensors such as lasers, lidar, or millimeter-wave radars. In the first embodiment, the detector 14 is a stereo camera which is basically two cameras in a single unit that is mounted to the watercraft 10.

Here, the watercraft 10 is provided with a drive-by-wire system that operates the watercraft 10, and that is configured to perform various operations of the watercraft 10. Specifically, the watercraft 10 is provided with a cockpit that has a steering wheel or helm 16 (e.g., a manual steering device) and a remote control 18 (e.g., a manual throttle-shift device). The steering wheel 16 is used by a driver or user to manually turn the watercraft 10, and thus, manually change a propulsion direction of the watercraft 10. The remote control 18 is used by a driver or user to manually control a propulsion force of the watercraft 10.

As mentioned above, as seen in FIGS. 1 and 2, the watercraft control system 12 is configured to maintain the watercraft 10 in a prescribed or desired orientation and the prescribed distance $Z_{des}$ with respect to the stationary or anchored object. The prescribed or desired orientation is typically set by the user positioning the watercraft 10 to a desired orientation and then setting that current orientation to the prescribed orientation. The prescribed distance $Z_{des}$ can be adjusted by the user to one of a plurality of preset target distances or can be infinitely adjusted by the user to any desired target distance within the capabilities of the detector 14 of the watercraft control system 12. Instead of the watercraft control system 12 using a target distance for maintaining the prescribed distance $Z_{des}$, the watercraft control system 12 can be configured to maintain the prescribed distance $Z_{des}$ within a predetermined target range. In other words, the watercraft control system 12 can be configured so that a prescribed distance $Z_{des}$ of the watercraft 10 from the watercraft control system 12 can vary within a target range while the watercraft 10 maintaining within the prescribed distance $Z_{des}$ from the stationary or anchored object. Stated differently, the watercraft control system 12 can be configured to maintain the prescribed distance $Z_{des}$ by either maintaining a target distance or a target range. Thus, as used herein, the term "prescribed distance" does not require a single distance to be maintained.

As explained later in more detail, once the user activates the watercraft control system 12 to enter the virtual anchoring mode and selects a stationary or anchored object, then the watercraft control system 12 engages an automatic throttle control to maintain the prescribed distance $Z_{des}$ and also engage an automatic steering control such that the watercraft 10 maintains the desired orientation relative to the object. After the virtual anchoring mode is activated, the watercraft driver does not need to input any control commands (i.e., hands free) unless the watercraft control system 12 experiences a failure or the watercraft driver wants to deactivate the watercraft control system 12 from the virtual anchoring mode.

Figure 3:
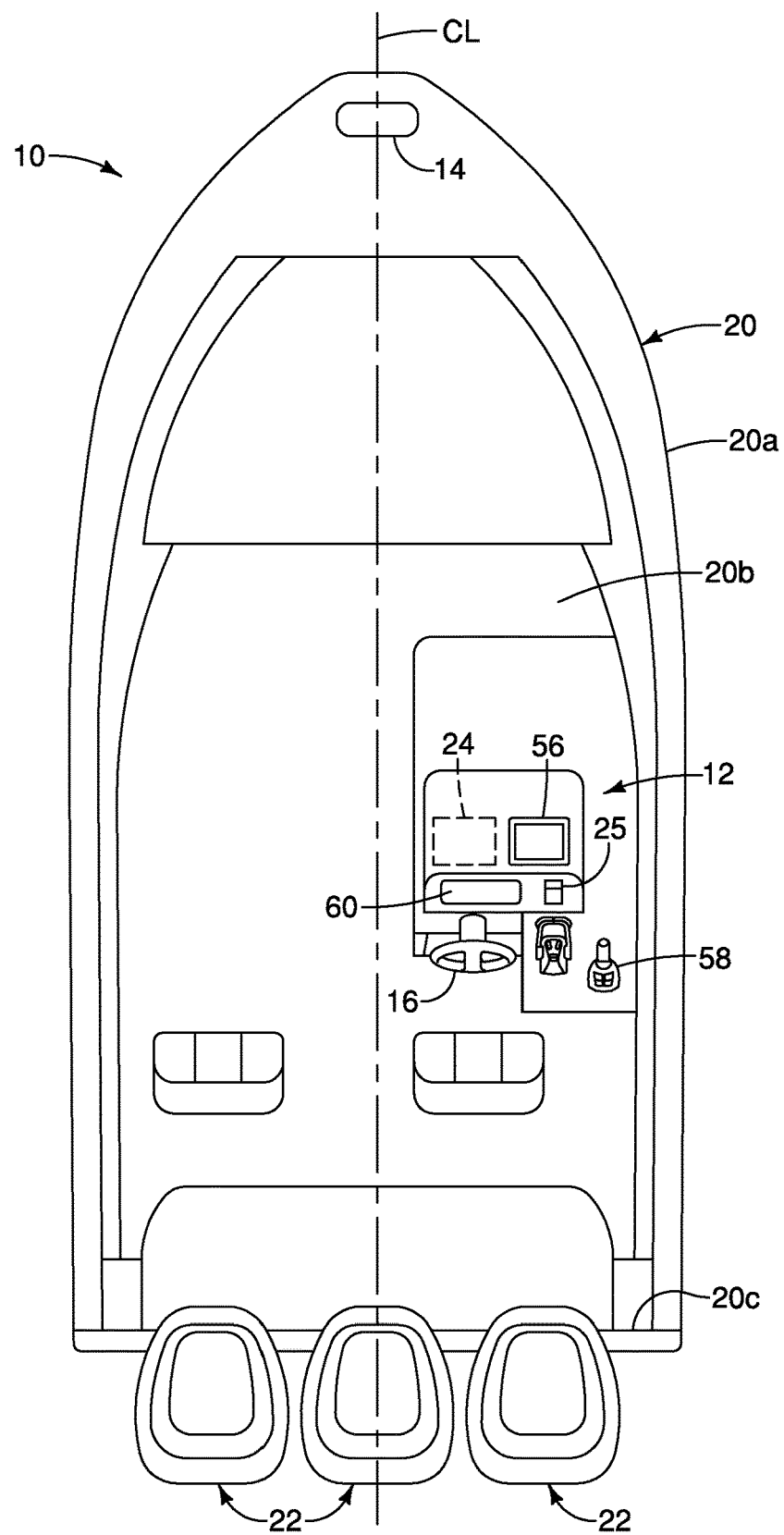
FIG. 3 is a simplified top view of the host watercraft including the watercraft control system in accordance with the present disclosure.

Referring to FIG. 3, a simplified top view of the watercraft 10 is illustrated, and some of the parts of the watercraft 10 will now be discussed. In the first embodiment, the watercraft 10 basically includes a watercraft body 20 and a plurality of propulsion units 22. The detector 14 is preferably mounted to the watercraft body 20 near the front end of the watercraft 10. Preferably, the detector 14 is disposed on a centerline CL of the watercraft body 20. However, the location of the detector 14 is not limited to the illustrated location.

Here, the watercraft 10 is illustrated as an outboard motor boat that is equipped with the watercraft control system 12. However, the watercraft control system 12 is not limited to being used with an outboard motor boat. Rather, as explained later, the watercraft control system 12 can be applied to practically any watercraft that includes a propulsion system and a steering system.

Here, the watercraft body 20 basically includes a hull 20a and a deck 20b. The deck 20b is provided on the hull 20a in a conventional manner. Preferably, the hull 20a and the deck 20b are integrated to form a unit. The hull 20a, the deck 20b and the other parts of the watercraft 10 are made of suitable materials that are typically used in watercrafts for a marine environment, and thus, the materials of the various parts of the watercraft 10 will not be discussed herein. However, the watercraft body 20 is not limited to the illustrated hull and deck construction. Rather, the construction of the watercraft body depends on the type of watercraft. For example, a watercraft body of a pontoon boat typically includes two or more pontoons that support a deck. Also, for example, the watercraft body may not have a deck.

Figure 4:
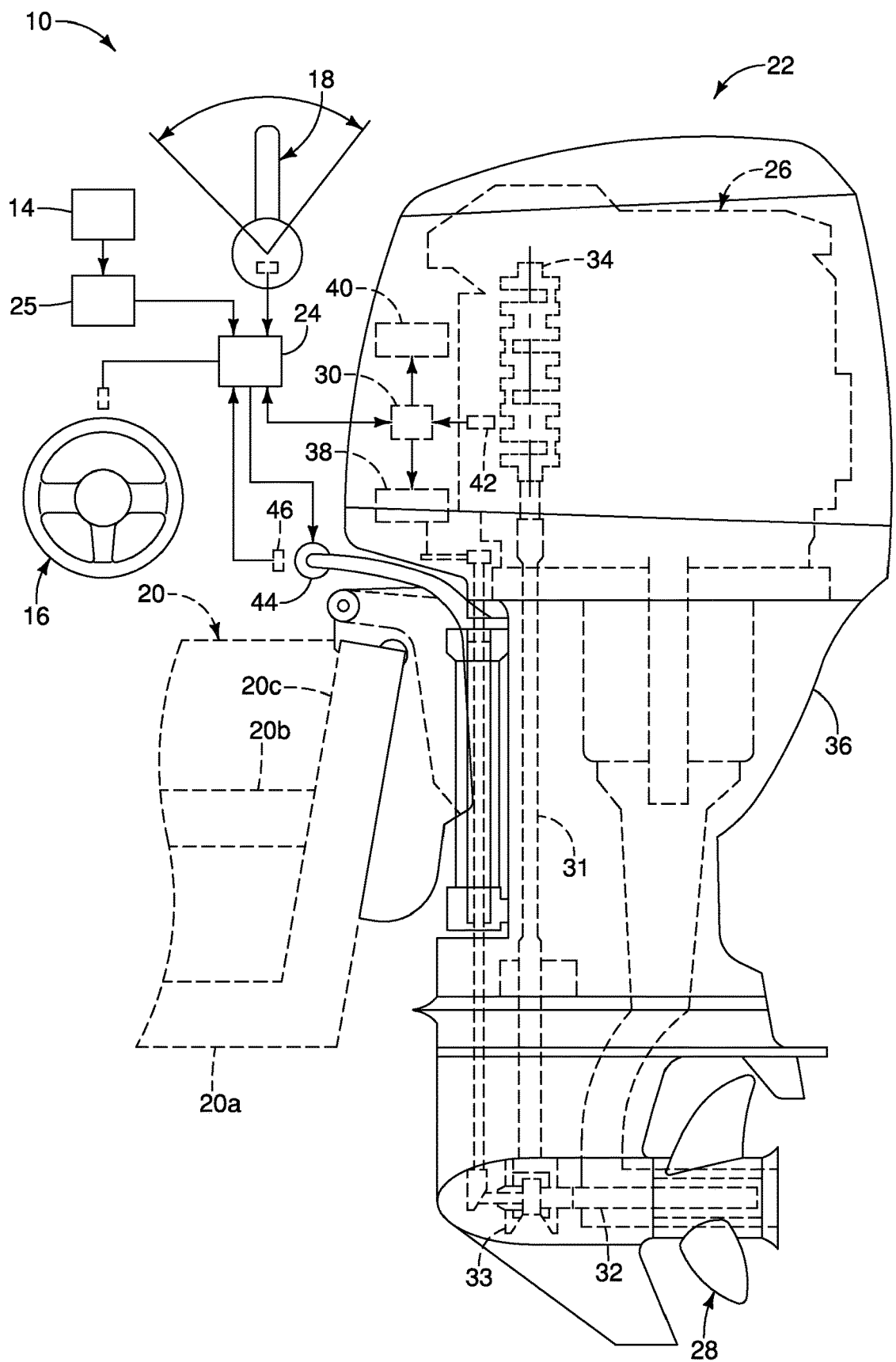
FIG. 4 is a simplified partial side view of a rear portion of the host watercraft showing one of the propulsion units with various controls schematically illustrated.

The propulsion unit 22 is provided to propel the watercraft 10 in a conventional manner. In the first embodiment, three of the propulsion units 22 are provided in the form of three outboard motors as seen in FIG. 3 (only one of the propulsion units 22 is shown in FIG. 4). However, the propulsion units 22 are not limited to this illustrated configuration of the first embodiment. It is acceptable for the propulsion units to be inboard motors or water jet propulsion devices instead of outboard motors. Basically, the term "propulsion unit" as used herein is a machine that produces a thrust to push a watercraft. The propulsion unit can also be referred to as a propulsion device or a propulsion system. A propulsion unit or device typically includes a drive source (e.g. an engine or an electric motor) and a propulsor (e.g. a propeller or an impeller) that provide a thrust to the watercraft.

While the watercraft 10 is illustrated as having three of the propulsion units 22, it will be apparent from this disclosure that the watercraft 10 can have only a single propulsion unit, two propulsion units, or more than three propulsion units, as needed and/or desired, depending on the particular design of the watercraft. Also, the watercraft 10 can be provided with one or more other types of propulsion units such as one or more water jet drives and/or inboard motors. In other words, the virtual anchoring mode of the watercraft control system 12 can be used with other types of propulsion systems other than the propulsion system illustrated in the first embodiment. In any case, the watercraft 10 comprises at least one propulsion unit that is provided to the watercraft body 20, and more preferably further comprises an additional propulsion unit 22 that is provided to the watercraft body 20.

The propulsion units 22 are controlled by the driver using the steering wheel 16 to manually turn the watercraft 10, and using the remote control 18 to manually control a propulsion force (thrust) of the watercraft 10. The remote control 18 is also used by the driver or user reverse the direction of the thrusts of the propulsion units 22. Preferably, the propulsion units 22 can be independently turned with respect to each other. Also, the thrust of the propulsion units 22 can be independently controlled by the driver or user. Here, the steering system of the watercraft 10 is a steer-by-wire system in which the steering wheel 16 is not mechanically connected to the propulsion units 22. However, the watercraft control system 12 can be adapted to a mechanical steering system. Likewise, the remote control 18 is not mechanically connected to the propulsion units 22. However, the watercraft control system 12 can be adapted to a watercraft having a mechanical throttle system. Since the steering systems and throttle systems are well known and the virtual anchoring mode of the watercraft control system 12 can be adapted to those known systems, the steering system and throttle system of the watercraft 10 of the first embodiment will only be briefly discussed herein.

Figure 5:
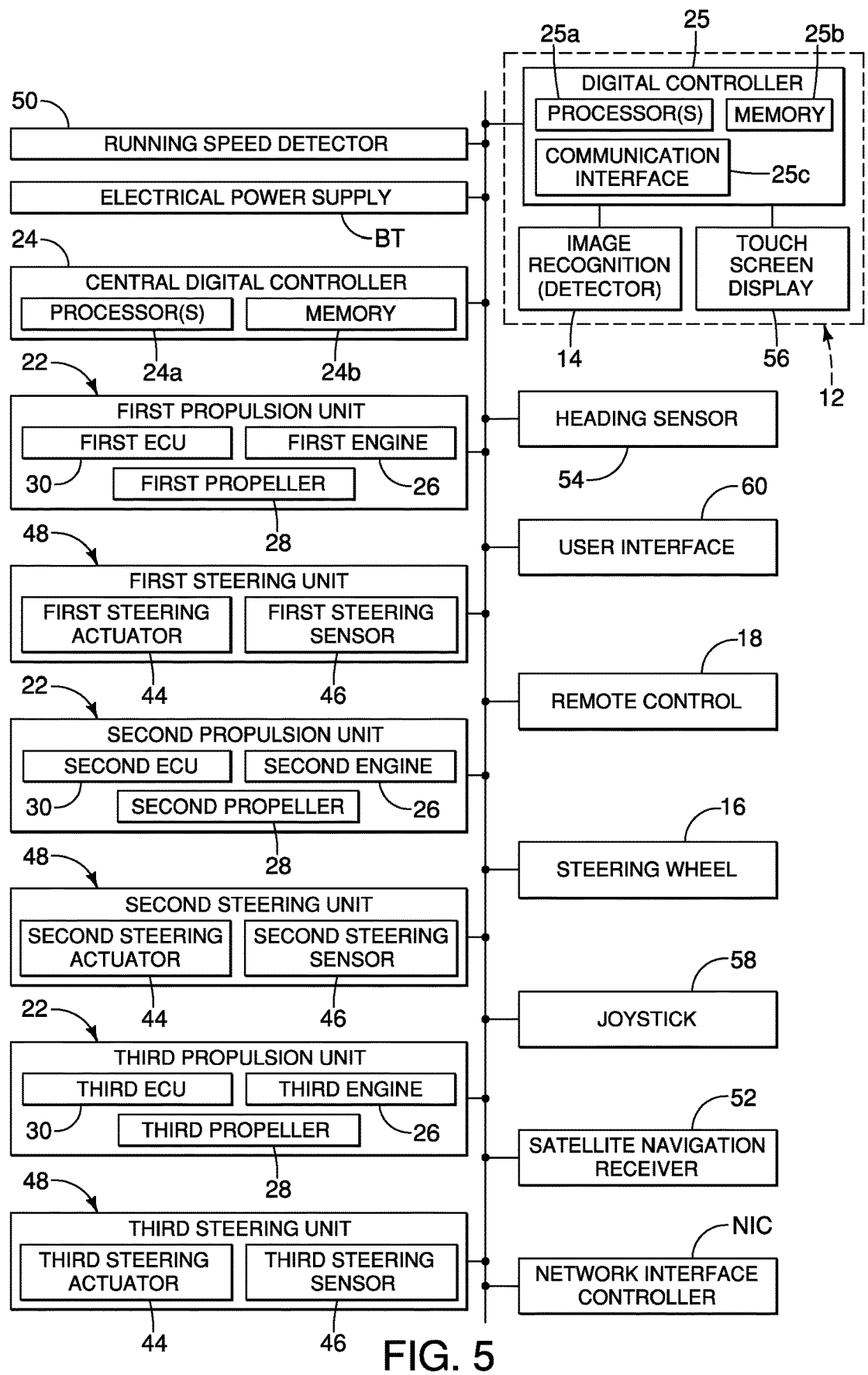
FIG. 5 is a block diagram of selected components of the host watercraft equipped with the watercraft control system having a digital controller (graphics processing unit or GPU) that communicates with a central digital controller (boat control unit or BCU) of the watercraft.

As seen in FIG. 5, a block diagram of selected components of the watercraft 10. As schematically illustrated in FIG. 5, the watercraft 10 is provided with a central digital controller 24 that is connected to a network of the watercraft 10, and the watercraft control system 12 includes a digital controller 25 that is connected to the network of the watercraft 10. For example, the network of the watercraft 10 can be Controller Area Network (CAN bus) that allow microcontrollers and devices to communicate with each other. The central digital controller 24 can be also referred to as a boat control unit (BCU), while the digital controller 25 can be also referred to as a graphics processing unit (GPU). In FIG. 5, the watercraft control system 12 is illustrated as an add-on component of the watercraft 10. However, the functions of the digital controller 25 (GPU) could be integrated into the central digital controller 24 (BCU). Thus, the term "digital controller" is not limited to a single controller having one or more processors, but rather includes one controller as well as two or more controllers that are physically separated from each other. Thus, for example, the term "digital controller" can include a GPU by itself, the BCU by itself or both the GPU and the BCU.

Also as seen in FIG. 5, the watercraft 10 is provided with an electrical power supply BT (e.g., a battery) for supplying electrical power the central digital controller 24 and the digital controller 25 as well as to the various electrical components of the watercraft 10. Of course, the digital controller 25 can have its own electrical power supply (e.g., a battery) if desired.

The central digital controller 24 can be a microcomputer. The central digital controller 24 includes a processor 24a, such as a CPU (Central Processing Unit) and memory 24b (computer storage) such as a ROM (Read Only Memory) and a RAM (Random Access Memory). The central digital controller 24 can also include other conventional components such as an input interface circuit and an output interface circuit. The processor 24a of the central digital controller 24 is programmed to control the various components of the boat 10 such as adaptive cruise control, autopilot control, satellite positioning control, etc. The memory 24b of the central digital controller 24 stores processing results, detection results and control programs such as ones for controlling the watercraft 10. For example, the RAM stores statuses of operational flags and various control data, while the ROM stores the control programs for various operations.

In the illustrated embodiment, the central digital controller 24 is programmed to control the propulsion units 22 in accordance with operation signals from the steering wheel 16 and the remote control 18 as well as control signals from the watercraft control system 12. The basic controls of the propulsion units 22 in accordance with the operation signals from the steering wheel 16 and the remote control 18 are relatively conventional, and thus, the basic controls of the propulsion units 22 will not be discussed in detail herein. The central digital controller 24 is also programmed to automatically control the at propulsion units 22 based on detection results of sensors or detectors.

While the central digital controller 24 and the watercraft control system 12 are illustrated as separate components in which the watercraft control system 12 is connected to the network of the watercraft 10, the watercraft control system 12 can be integrated with the central digital controller 24. In other words, here, the watercraft control system 12 is an add-on component that is plugged into the network of the watercraft 10. Thus, as illustrated in FIG. 5, the watercraft control system 12 includes its own digital controller 25 having at least one processor 25a, such as a CPU (Central Processing Unit) and memory 25b (computer storage) such as a ROM (Read Only Memory) and a RAM (Random Access Memory). On the other hand, if the watercraft control system 12 is fully integrated into the watercraft 10, then the watercraft control system 12 can use the central digital controller 24 to carry out the virtual anchoring mode.

The digital controller 25 is configured to communicate with the detector 14 to receive a detection signal from the detector 14. Also, the digital controller 25 is configured to output at least one control command to at least one of the propulsion units 22 of the watercraft 10 to maintain the prescribed distance $Z_{des}$ and the heading ($x_{des}$) between the watercraft 10 and the stationary or anchored object (e.g., the anchored buoy O1 or the bridge O2). Here, for example, the digital controller 25 is provided with a communication interface 25c that is used to communicate with the detector 14 either wirelessly or via a wired connection to the network of the watercraft 10. Thus, the digital controller 25 can also communicate with the onboard computer system of the watercraft 10 via the communication interface 25c. Here, for example, the digital controller 25 is plugged into a network interface controller NIC (e.g., a MicroAutoBox by dSpace), and the detector 14 is plugged into a USB port of the communication interface 25c of the digital controller 25. The processor 25a of the digital controller 25 (the GPU 25) communicates with the digital controller 24 (the BCU). In this way, the digital controller 25 can communicate with the central digital controller 24 and the propulsion units 22 to control the propulsion force of the watercraft 10 as well as communicate with the other components of the watercraft 10 that are connected to the network of the watercraft 10.

Here, the detection signal from the detector 14 is a pair of images since the detector 14 includes a stereo camera. By using a stereo camera as the detector 14 can detect the presence of the stationary or anchored object (e.g., the anchored buoy O1 or the bridge O2) as well as be used to determine the distance between the stationary or anchored object and the watercraft 10. Also, the images captured by the detector 14 can be used to provide the predetermined lateral offset amount OS.

Using the detection results of the detector 14, the digital controller 25 then controls a propulsion direction of the watercraft 10 and a propulsion force of the watercraft 10 so that the watercraft 10 maintains the prescribed distance $Z_{des}$ from the stationary or anchored object that is selected as a reference point. In the first embodiment, the digital controller 25 is configured to selectively carry out at least one of differential steering and rudder steering to change the propulsion direction of the watercraft 10 in order to maintains both the prescribed distance $Z_{des}$ and the desired orientation of the watercraft 10 with respect to the stationary or anchored object, as discussed later.

In the case in which a stereo camera is utilized for the detector 14, the digital controller 25 (GPU) is provided with an image detection program to detect the stationary or anchored object within the image that is captured by detector 14. The processor 25a of the digital controller 25 is connected to the detector 14 (e.g., the camera) and receives the image data of the camera view in front of the watercraft 10. From the image data, the processor 25a of the digital controller 25 detects the stationary or anchored objects within the image that is captured by the detector 14, and determines lateral and longitudinal positions of the stationary or anchored objects. The lateral and longitudinal positions of the stationary or anchored objects are then communicated from the digital controller 25 (GPU) to the digital controller 24 (BCU).

The image detection program can use any detection method available. The detection method that is used will depend on the types of devices used as the detector 14. For example, the image detection program of the digital controller 25 can use either (1) a hypothesis generation methodology where the locations of potential objects in an image are hypothesized by using object information such as symmetry, color, shadow, corners, horizontal/vertical edges, texture, and watercraft lights; or (2) a hypothesis verification methodology that verifies the presence of an object in an image by analyzing differences between the images observed and known object models or templates. If a stereo camera is utilized for the detector 14, then a disparity map process can be used to process the corresponding pixels in the two (right and left) images to find the differences for determining the presence of a stationary or anchored object in the images. Alternatively, when using a stereo camera for the detector 14, then an inverse perspective mapping process can be used for determining the presence of a stationary or anchored object in the images. Since these methodologies for determining the presence of an object in an image are known, these methodologies will not be discussed in further detail herein.

Still referring to FIG. 5, each of the propulsion units 22 basically includes an internal combustion engine 26 (i.e., a drive source) and a propeller 28 (i.e., a propulsor). Of course, the drive sources for the propulsion units 22 can be electric motors. Moreover, instead of using the propulsion units 22 in the virtual anchoring mode, the watercraft 10 can be provided with one or more supplemental propulsion units (not shown) that are used in the virtual anchoring mode to maintain the prescribed distance and the desired orientation relative to a stationary or anchored object. These supplemental propulsion units (not shown) can include, for example, one or more electric motors that drives one or more propellers.

Here, each of the propulsion units 22 further includes an engine control unit 30 (ECU). Alternatively, for example, the engine control units 36 can be omitted and the control of the internal combustion engines 26 (hereinafter "the engines 26") can be performed by the central digital controller 24. Here in FIG. 5, the engines 26 are referred to as first engine, second engine and third engine to distinguish the engines 26. Likewise, in FIG. 5, the propellers 28 are referred to as first propeller, second engine and third propeller. Also, in FIG. 5, the engine control units 36 are referred to as first ECU, second ECU and third ECU. Each of the engine control units 30 is a digital controller similar in configuration to the configuration of the central digital controller 24 that is previously discussed. Each of the engine control units 30 is programmed to control its respective propulsion unit 22 to independently generate the propulsion forces of the propulsion units 22, respectively, and to independently steer or turn the propulsion units 22, respectively, in order to propel and steer the watercraft 10.

Referring back to FIG. 4, one of the propulsion units 22 is illustrated in more detail. Since the construction of the propulsion units 22 are the same, the description of the propulsion unit 22 illustrated in FIG. 4 also applies to the other propulsion units 22. The propulsion unit 22 is mounted to a rear portion 20c of the hull 20 in a conventional manner. The engine 26 is connected to the propeller 28 via a drive shaft 31 and a propeller shaft 32. The propeller shaft 32 is connected to the drive shaft 31 through a drive transmission 33. The engine 26 rotates the propeller 28 via the drive shaft 31 and the propeller shaft 32 to generate a thrust for propelling the watercraft 10. The drive transmission 33 switches the rotational direction of the power to be transmitted from the drive shaft 31 to the propeller shaft 32. The drive transmission 33 includes, for instance, a plurality of gears and a clutch that changes meshing of the gears. The drive shaft 31 is operatively connected to a crankshaft 34 of the engine 26 so that rotation of the crankshaft 34 is transmitted to the drive shaft 31 which in turn transmits rotation to the propeller shaft 32 to rotate the propeller 28. The engine 26, the drive shaft 31, the propeller shaft 32 and the drive transmission 33 are provided in a housing 36.

The propulsion unit 22 is provided with a shift actuator 38 that is electrically connected to the engine control unit 30 as seen in FIG. 4. The shift actuator 38 includes, for example, an electric motor or other types of actuators that is configured to switch an operating position of the drive transmission 33 of the propulsion unit 22 to a forward position to generate a forward propulsion force, a reverse position to generate a reverse propulsion force, or a neutral position. Thus, the shift actuator 38 is configured to operate the drive transmission 33 to change rotational direction of the propeller shaft 32 and the propeller 28 between a forward drive thrust and a reverse drive thrust. Preferably, the shift actuator 38 is an electric actuator that is electrically controlled by the engine control unit 30. The engine control unit 30 is programmed to operate the shift actuator 38 to control the drive transmission 33 based on a control signal received from the central digital controller 24 and/or the digital controller 25 of the watercraft control system 12. In this way, the central digital controller 24 and/or the digital controller 25 can carry out differential steering and switching between a forward propulsion and a reverse propulsion.

The propulsion unit 22 is also provided with a throttle actuator 40 that is electrically connected to the engine control unit 30 as seen in FIG. 4. The throttle actuator 40 includes, for example, an electric motor or other types of actuators for change the output of the engine 26. Namely, the throttle actuator 40 changes an opening degree of a throttle valve to adjust the output or speed of the engine 26. Preferably, the throttle actuator 40 is an electric actuator that is electrically controlled by the engine control unit 30. The propulsion unit 22 is also provided with an engine speed sensor 42 that detects a rotational speed of the crankshaft 34 of the engine 26 to determine an engine rotational speed of the engine 26. The detection signal of the engine speed sensor 42 is transmitted to the engine control unit 30, the central digital controller 24 and/or the digital controller 25. The engine control unit 30 is programmed to operate the throttle actuator 40 to control the speed of the engine 26 based on a control signal received from the central digital controller 24 and/or the digital controller 25 of the watercraft control system 12. In this way, the central digital controller 24 and/or the digital controller 25 can carry out throttle control of the engine 26.

The propulsion unit 22 is also provided with a steering actuator 44 that is electrically connected to the engine control unit 30 as seen in FIG. 4. The steering actuator 44 includes, for example, a hydraulic or electric cylinder, or other types of actuators that is provided to turn the propulsion unit 22 relative to the watercraft 10. The propulsion unit 22 is also provided with a steering angle sensor 46 that detects a steering angle of the propulsion unit 22. The steering angle sensor 46 can be, for example, a stroke sensor of the hydraulic cylinder of the steering actuator 44. The steering angle sensor 46 transmits the detection result to the engine control unit 30, the central digital controller 24 and/or the digital controller 25. The engine control unit 30 is programmed to operate the steering actuator 44 to control the propulsion direction of the watercraft 10.

Referring again to FIG. 5, with this configuration of the watercraft 10, the propulsion units 22 can be operated to carry out rudder control (i.e., turning the propulsion unit as a rudder) and/or differential control (i.e., operating at least one of the propulsion units with a different thrust output with respect to at least one other of the propulsion units) for changing the propulsion direction of the watercraft 10. Thus, the watercraft 10 has three steering units 48 with each of the steering units 48 having one of the steering actuator 44 for carrying out rudder control. Alternatively, with certain watercrafts, either the rudder control or the differential control to maintain the orientation of the watercraft with respect to the stationary or anchored object can be omitted from the virtual anchoring mode of the watercraft control system 12 as needed and/or desired.

In the first embodiment, a driver input provided to the steering wheel 16 is electronically communicated through the central digital controller 24. A steering sensor (not shown) is in communication with at least one of the steering wheel 16 and a steering shaft that is associated with the steering wheel 16. The steering sensor 46 is arranged to provide a signal indicative of a rotational position, angular position, input force, or input torque applied to at least one of the steering wheel 16 or a steering shaft (not shown) associated with the steering wheel 16 to the central digital controller 24. The central digital controller 24 is arranged to receive the signal and provide commands or signals to the engine control units 30 of the propulsion units 22 and/or the steering actuator 44 to move the propulsion units 22 as a rudder. However, when the watercraft control system 12 is in the virtual anchoring mode, the driver inputs are not required, and the propulsion units 22 and/or the steering actuator 44 are controlled by the central digital controller 24 and/or the digital controller 25 based on detection signals from various sensors.

As seen in FIG. 5, for example, the watercraft 10 can be provide with a running speed detector 50 (e.g., a GPS speedometer, a pitot speedometer, etc.), a satellite navigation receiver 52 (e.g., a Global Positioning System (GPS) receiver, a Navigation Satellite System (NSS) receiver, or a Global Navigation Satellite System (GNSS) receiver), and a heading sensor 54 (e.g., an on-board gyro and tilt sensors). The running speed detector 50, the satellite navigation receiver 52 and the heading sensor 54 can be integrated into a single unit that provides speed data, heading data and position data. The running speed detector 50, the satellite navigation receiver 52 and the heading sensor 54 are connect to the digital controller 25 by the network of the watercraft 10 so that commands or signals are communicated to the digital controller 25 via the network of the watercraft 10. The speed of the watercraft 10 can be provided to the digital controller 25 by a detection signal from the running speed detector 50, or can be provided to the digital controller 25 a GNSS signal that is received by the satellite navigation receiver 52. The position of the watercraft 10 can be provided to the digital controller 25 based on the GNSS signal that is received by the satellite navigation receiver 52 in combination with map data that is stored in memory. The heading of the watercraft 10 can be provided to the digital controller 25 based on a detection signal from the heading sensor 54. Thus, the digital controller 25 receives the speed of the watercraft 10, the relative position of the watercraft 10, and the relative heading of the watercraft 10 based on detection results from various detectors and/or sensors.

Figure 6:
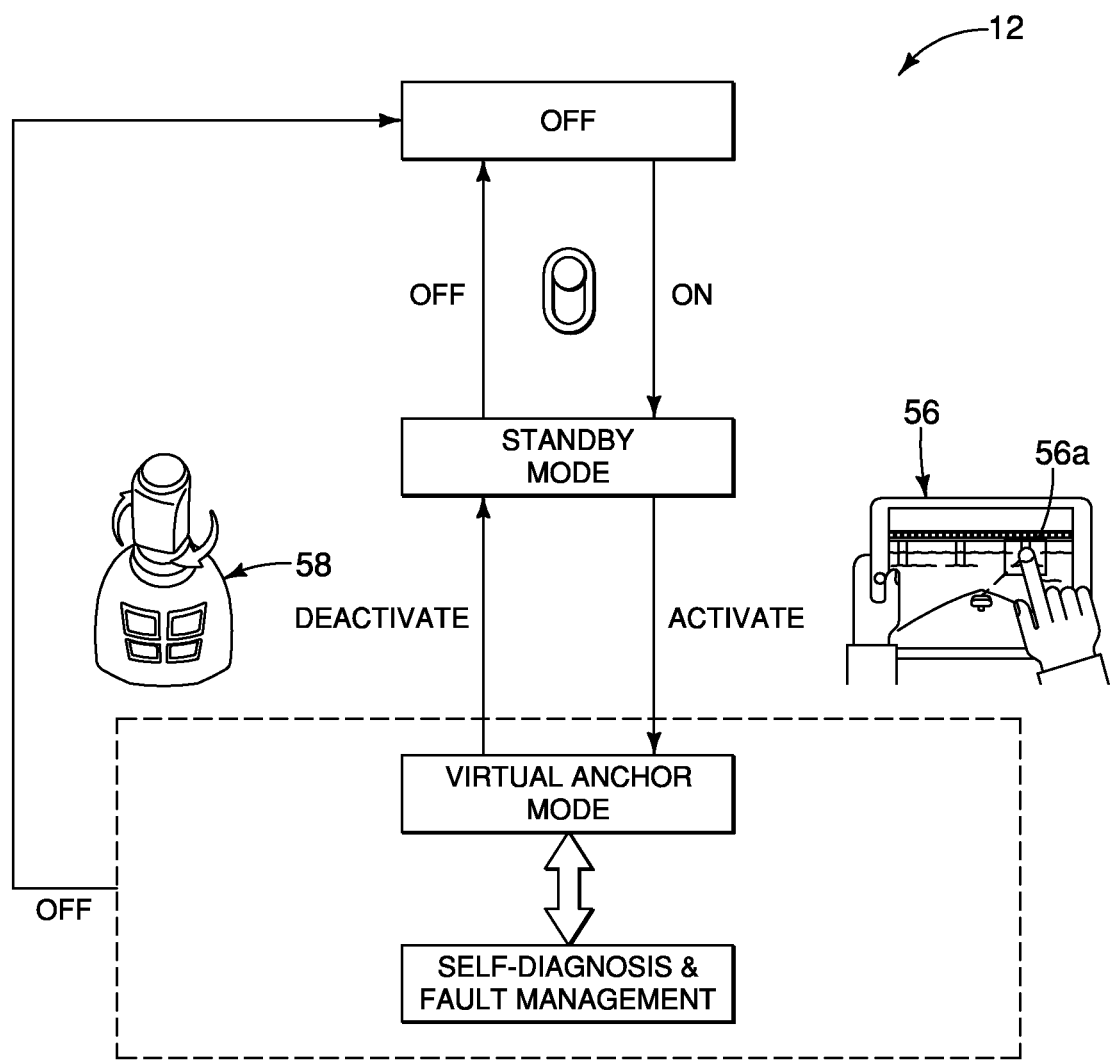
FIG. 6 is a simplified high level logic diagram illustrating a virtual anchoring mode executed by the watercraft control system.

Preferably, as seen in FIG. 6, the watercraft control system 12 further comprises a user interface such as a Multi-Function Display, a wireless tablet 56 and/or a joystick 58 that communicates with the digital controller 25. The tablet 56 preferably has a processor that communicates with the processor 25a of the digital controller 25 and a display screen, such that the tablet 56 displays the current image from the detector 14 as well as other information related to the virtual anchoring mode such as the distance between the watercraft 10 and the stationary or anchored object, the speed of the watercraft 10, the heading of the watercraft 10, etc.

Here, the joystick 58 is provided on the watercraft body 20 and programmed to be used to operate with the wireless tablet 56 and the digital controller 25. In this way, the user can use the wireless tablet 56 and/or the joystick 58 to activate and deactivate the virtual anchoring mode. In the first embodiment, the wireless tablet 56 (i.e., the user interface) includes a touch screen 56a (i.e., a user input) that is used to select the stationary or anchored object. Thus, the digital controller 25 is configured to select the stationary or anchored object based on an input from the user input (e.g., the touch screen 56a and/or the joystick 58).

Alternatively, the watercraft control system 12 can use a user interface 60 that is built into the watercraft 10 instead of or in conjunction with the wireless tablet 56. The user interface 60 is often referred to as a Multi-Function Display. The user interface 60 of the watercraft 10 can be a touch screen display, or a display without a touch screen, and one or more knobs and/or buttons. The wireless tablet 56, the joystick 58 and/or the user interface 60 can be used to manually switch between the detector based virtual anchoring mode and the satellite based virtual anchoring mode.

The virtual anchoring mode executed by the digital controller 25 will now be discussed with reference to FIGS. 6 to 11. As seen in FIG. 6, a state transition logic is illustrated for the watercraft control system 12. When the watercraft 10 is started, the central digital controller 24 and the digital controller 25 are initialized and various other components are automatically activated including the detector 14. Before the user selects a stationary or anchored object, the watercraft control system 12 will enter a standby mode. In standby mode, the watercraft control system 12 waits for the user to select a stationary or anchored object, but the digital controller 25 has not yet taken over the controls from the user. For the digital controller 25 to take over, a user must select a stationary or anchored object on the tablet 56, or using the joystick 58. Alternatively, the digital controller 25 can be woken up by using the user interface 60 of the watercraft 10.

Figure 12:
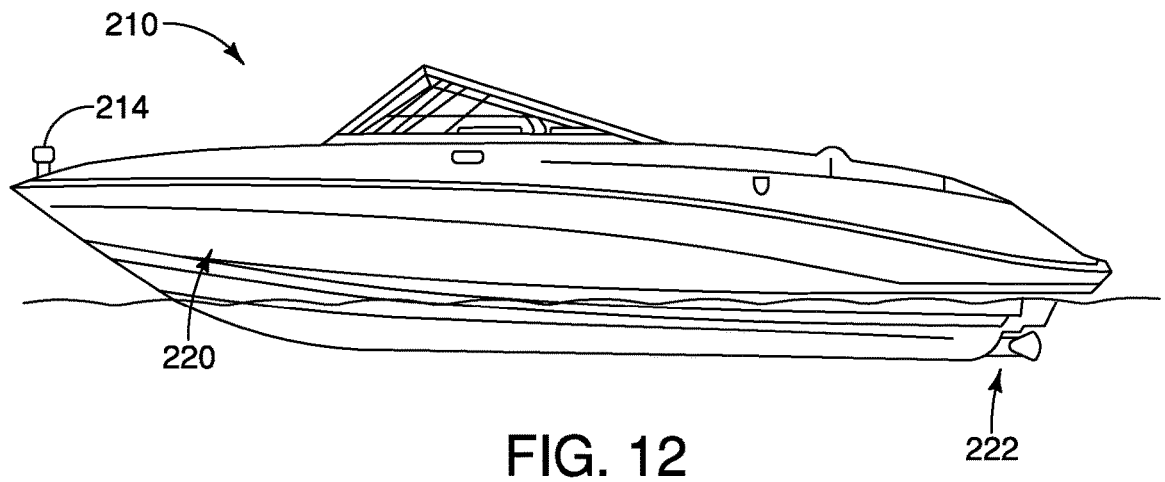
FIG. 12 is a side elevational view of a host watercraft equipped with the watercraft control system in which the host watercraft is a jet boat that uses jet propulsion.
Figure 13:
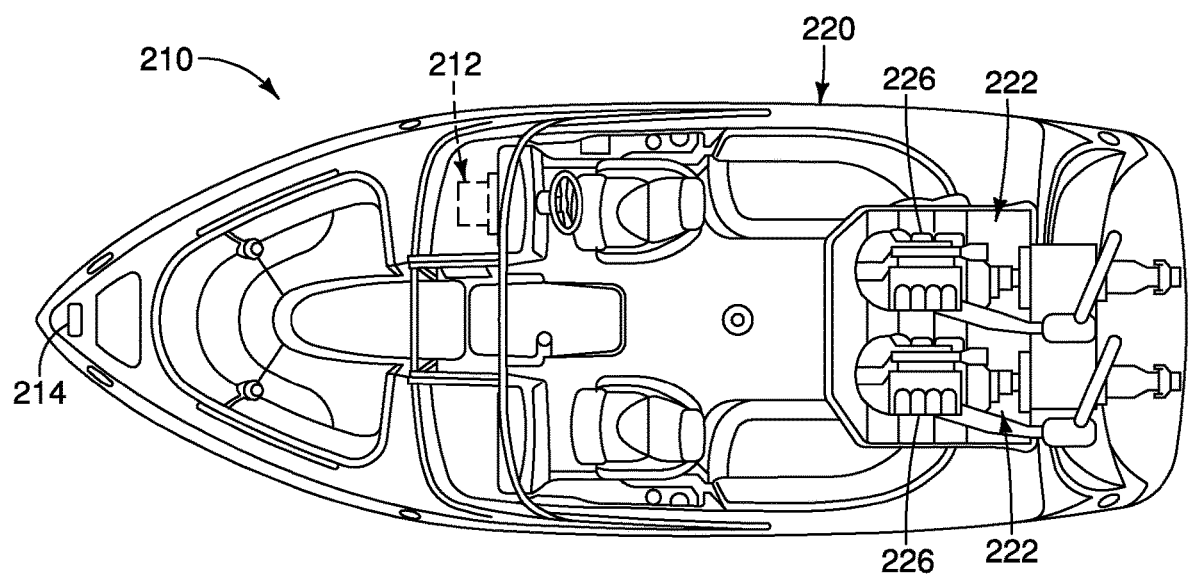
FIG. 13 is a top view of a host watercraft illustrated in FIG. 12 with a portion of the watercraft broken away to reveal a pair of jet propulsion units.

Once the user selects a stationary or anchored object, the digital controller 25 activates the automatic virtual anchoring process (i.e., the user engage the virtual anchoring mode). While in the virtual anchoring mode, there are no necessary inputs required from the driver of the watercraft 10, unless the watercraft control system 12 experiences a failure or the driver of the watercraft 10 requests the virtual anchoring mode to be disengaged. While in the virtual anchoring mode, the control processes of FIGS. 12 and 13 are simultaneously executed to control both the steering (propulsion direction) and the throttle (propulsion force and/or propulsion direction).

As previously mentioned, the virtual anchoring mode of the watercraft control system 12 includes a detector based virtual anchoring mode and a satellite based virtual anchoring mode. In the detector based virtual anchoring mode, the detector 14 is used to detect a stationary or anchored object as a reference point for the digital controller 25 to maintain the watercraft 10 in a substantially stationary position by adjusting the propulsion units 22 and/or the steering units 50 of the watercraft 10 to maintain the prescribed distance $Z_{des}$ and the prescribed orientation with respect to the stationary or anchored object. The detector based virtual anchoring mode is especially useful for situations in which a satellite signal that provides positioning information is not available to the watercraft 10, or when higher accuracy is required than that provided by the GPS.

In the satellite based virtual anchoring mode, the detector 14 is no longer used for maintaining the prescribed distance and the desired orientation of the watercraft 10 with respect to the stationary or anchored object. Rather, in the satellite based virtual anchoring mode, the digital controller 25 uses a satellite position signal from the satellite navigation receiver 52 instead of a detection signal from the detector 14 for maintaining the prescribed distance and the desired orientation of the watercraft 10 with respect to the stationary or anchored object. In the satellite based virtual anchoring mode, the digital controller 25 can use any conventional satellite based virtual anchoring program for maintaining the watercraft 10 in a particular position on the water.

Alternatively, the logic explained below with reference to FIGS. 8 to 11 can be adapted to controlling the position and orientation of the watercraft 10 using a satellite position signal from the satellite navigation receiver 52. Preferably, the digital controller 25 is configured to switch control from the detection signal from the detector 14 to a satellite position signal from the satellite navigation receiver 52 based on a predetermined watercraft condition (e.g., the ability of the satellite navigation receiver 52 to receive satellite position signal or the speed of the watercraft 10). Thus, for example, the digital controller 25 is configured to switch control from the detection signal from the detector 14 to a satellite position signal from the satellite navigation receiver 52 based on the prescribed distance $Z_{des}$ being greater than a prescribed threshold. This prescribed threshold can be set based on the capabilities of the detector 14 to detect a stationary object. Alternatively, for example, the digital controller 25 is configured to switch control from the detection signal from the detector 14 to a satellite position signal from the satellite navigation receiver 52 based on the ability of the satellite navigation receiver 52 to receive satellite position signal. x Referring to FIGS. 6 and 7, when a user wants to enter the virtual anchoring mode, the user first selects a stationary or anchored object such as the bridge O2 using the touch screen 56a of the tablet 56. Once the stationary or anchored object has been selected, the digital controller 25 determines the current distance and current orientation of the watercraft 10 with respect to the stationary or anchored object from the image (camera frame) obtained by the detector 14 (e.g., the stereo camera). Thus, the digital controller 25 can both detect the stationary or anchored object O2 and determine the distance and the position of the stationary or anchored object O2 with respect to the watercraft 10. Using this information, the digital controller 25 can maintain the desired distance and the desired orientation of the watercraft 10 with respect to the stationary or anchored object O2.

The current distance at the time of the selection of the stationary or anchored object can be automatically set as the prescribed distance $Z_{des}$. Likewise, the current position at the time of the selection of the stationary or anchored object can be automatically set as the desired or prescribed orientation of the watercraft 10 with respect to the stationary or anchored object. In this way, the driver can maneuver the watercraft 10 to the desired location and then just start the virtual anchoring mode to set the virtual anchoring with respect the selected stationary or anchored object.

Alternatively, the user can manually set or adjust the distance and orientation of the watercraft 10 with respect to the stationary or anchored object at any time after the stationary or anchored object was selected. The user can use the tablet 56, the joystick 58 and/or the user interface 60 to set or adjust the distance and orientation of the watercraft 10 with respect to the stationary or anchored object while in the virtual anchoring mode using the camera image. For example, the number of pixels that form the image in the camera frame can be normalized such that the middle or center of the camera image is set to "0", and the pixel at each edge of the camera image is set to ~100% and 100%. In short, the user specifies to the digital controller 25 at which percentage to position the watercraft 10 with respect to the stationary or anchored object. In this way, the user sets the distance and orientation of the watercraft 10 with respect to the stationary or anchored object by using the tablet 56, the joystick 58 and/or the user interface 60 based on the camera image.

Figure 8:
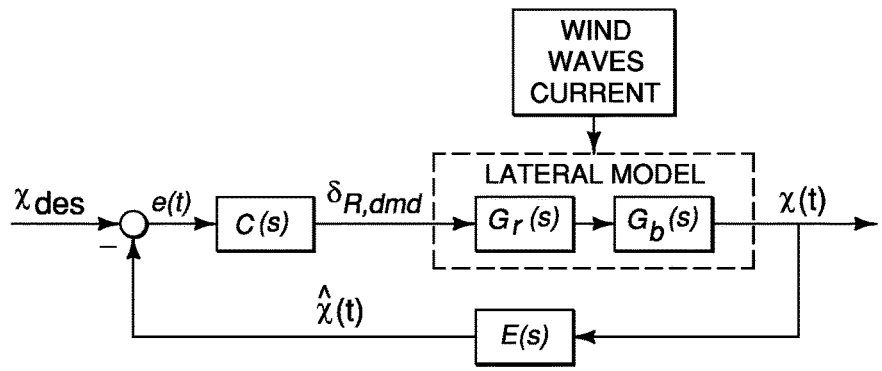
FIG. 8 is an example of a block diagram of the on-board lateral control system executed by the digital controller of the watercraft control system during the virtual anchoring mode.

Referring to FIG. 8, lateral control of the watercraft 10 to maintain the desired or prescribed orientation of the watercraft 10 with respect to the stationary or anchored object can be achieved by differential thrust control alone or in combination with rudder control. During the virtual anchoring operation using differential thrust control, the watercraft 10 modifies the thrust of one or more of the propulsion units 22 based on a difference between a target azimuth angle and an actual azimuth angle.

Figure 7:
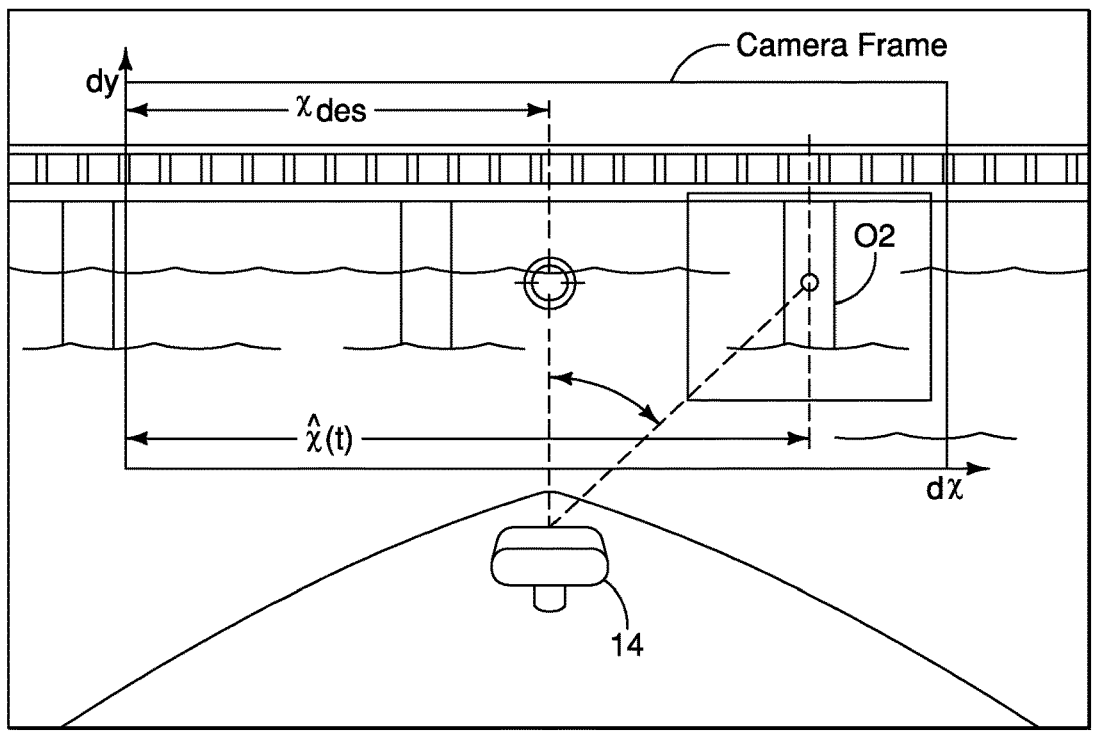
FIG. 7 is a front landscape view looking forward from the host watercraft at a stationary or anchored object (e.g., a bridge) that includes a field of view of the camera in which the watercraft control system maintains a prescribed distance from the stationary or anchored object in accordance with the present disclosure.

Preferably, as seen in FIG. 8, feedback control can be used based on the detection results from the image in FIG. 7 to control a rudder angle $\delta_R$ of the watercraft 10 to maintain the desired orientation of the watercraft 10 with respect to the stationary or anchored object. More specifically, as seen in FIG. 8, the digital controller 25 regulate the heading of the watercraft 10 based on a camera coordinate using the rudder angle $\delta_R$ of the watercraft 10. As seen in FIG. 8, the feedback control generally used to control the heading of the watercraft 10 by inputting a desired heading point $x_{des}$, which varies at each point in time because it depends on the location of the stationary or anchored object with respect to the watercraft 10.

In the case of the desired heading point $x_{des}$ aligning with the desired heading point $x_{des}$, the goal of the lateral feedback control is to drive the resulting error $e_{lat}$ to zero (i.e., $e_{lat}=x_{des}-x(t)$), even in the presence of disturbances such as wind, wave and currents which may act to drive the watercraft 10 away from the desired reference point. In the case of the orientation of the watercraft 10 being offset from the stationary or anchored object, the goal of the lateral feedback control is to drive the resulting error to the amount of the desired offset, even in the presence of disturbances such as wind, wave and currents which may act to drive the watercraft 10 away from the desired tracking point. Thus, as seen in FIG. 8, the digital controller 25 controls the orientation of the watercraft 10 using differential control such that the desired heading point $x_{des}$ either aligns with or is offset from the estimated current heading point x(t) to obtain the desired orientation of the watercraft 10. In this way, the orientation of the watercraft 10 with respect to the stationary or anchored object can be maintained.

The desired azimuth angle with respect to the stationary or anchored object can be determined from the desired heading point ides and can be controlled by the user from the touch screen 56a and/or the user interface 60 (Multi-Function Display) of the watercraft 10. Also, the user can twist or tilt the joystick 58 to temporarily change the orientation of the watercraft 10 from the desired orientation of the watercraft 10 that was previously set. Thus, the orientation of the watercraft 10 will remain in the adjusted orientation as long as the user twists or twist or tilts the joystick 58 from its rest or neutral position. Once the user releases or moves the joystick 58 back to the rest or neutral position, the digital controller 25 changes the orientation of the watercraft 10 back to the desired orientation of the watercraft 10 that was previously set. Alternatively, the digital controller 25 maintain the watercraft 10 at the new location once the joystick 58 or other user input device is released. Of course, it will be apparent from this disclosure that the orientation of the watercraft 10 with respect to the stationary or anchored object can be controlled and/or set by the user in a variety of ways and is not limited to the above mentioned ways.

Figure 9:
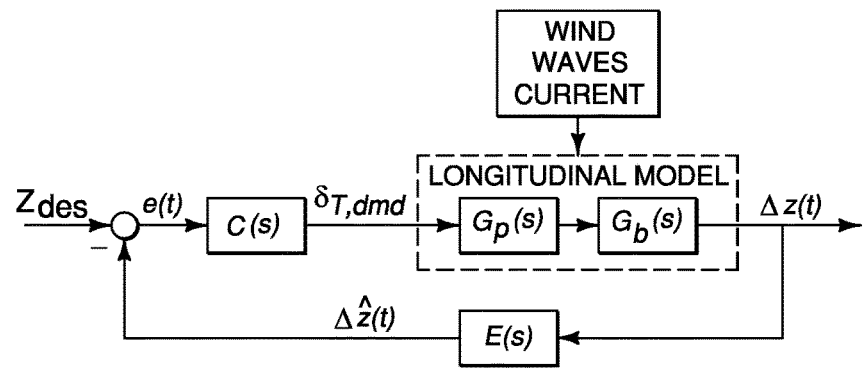
FIG. 9 is an example of a block diagram of the on-board longitudinal control system executed by the digital controller of the watercraft control system together with the on-board lateral control system of FIG. 8 during the virtual anchoring mode.

Referring to FIG. 9, the longitudinal (distance) control of the watercraft 10 during the virtual anchoring mode will be discussed. As mentioned above, the longitudinal control of the watercraft 10 can be achieved by adjusting the propulsion forces of the propulsion units 22. The longitudinal control process employed in the virtual anchoring mode allows for the watercraft 10 to maintain the prescribed distance $Z_{des}$ from the stationary or anchored object.

As seen in FIG. 9, feedback control is employed based on the estimated distance Δz(t) provided by the detector 14, where the output of the digital controller 25 becomes the prescribed throttle level $δ_T$ to the throttle actuators 40 of the engines 26 of the watercraft 10 in order to properly maintain the prescribed (desired) distance $Z_{des}$. More specifically, as seen in FIG. 9, the digital controller 25 regulates the propulsion force of the watercraft 10 to obtain the following condition: $Δz(t)=Z_{des}$, even in the presence of disturbances such as wind, waves, and current.

The goal of the digital controller 25 is to minimize the error between the prescribed (desired) distance $Z_{des}$ and the estimated current distance Δz(t) to the stationary or anchored object. The digital controller 25 samples the image data from the detector 14 at a prescribed interval, and the digital controller 25 then increases or decreases the throttles of the engines 26 based on whether the watercraft 10 is closer or farther from the prescribed (desired) distance $Z_{des}$ at that point in time.

Figure 10:
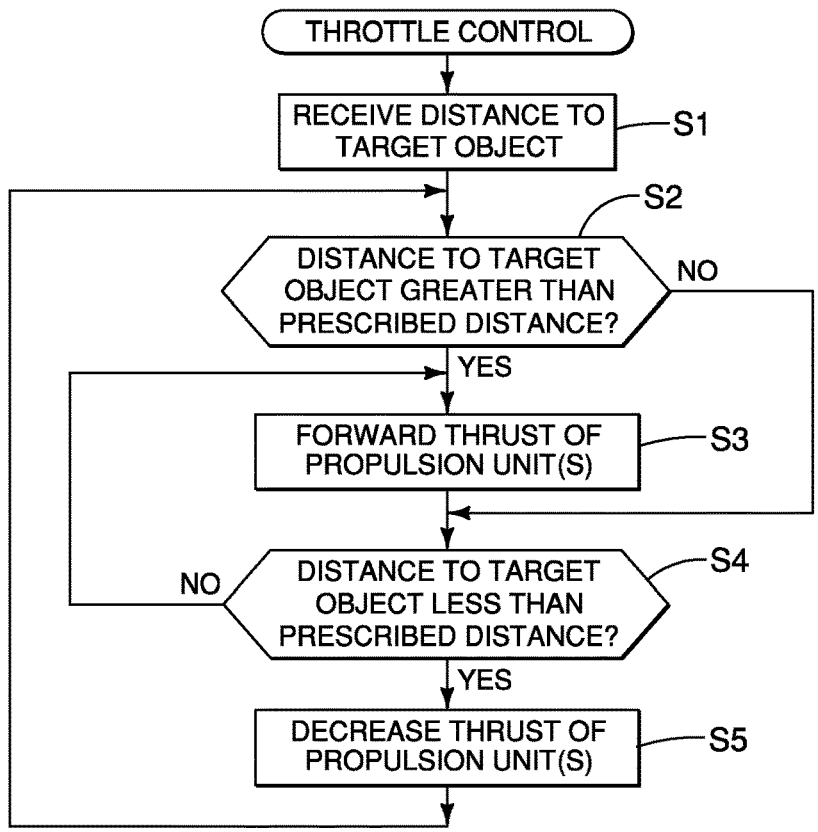
FIG. 10 is an example of a throttle (longitudinal) control flow chart of the throttle control executed by the watercraft control system during the virtual anchoring mode.

Referring now to FIG. 10, one example of a throttle (longitudinal) control flow chart of the steering control is illustrated that is executed by the digital controller 25 of the watercraft control system 12 during the virtual anchoring mode. More specifically, the digital controller 25 is configured to output at least one control command related to a propulsion direction of the watercraft 10 and a propulsion force of the watercraft 10 to at least the propulsion units 22 to maintain the prescribed distance $Z_{des}$ from the stationary or anchored object. Thus, the digital controller 25 controls the engines 26 of the propulsion units 22 to maintain the prescribed distance $Z_{des}$ from the stationary or anchored object while also performing the steering control to allow the watercraft 10 to maintain the desired the orientation of the watercraft 10. As mentioned above, the prescribed distance $Z_{des}$ can be adjusted using the tablet 56, the joystick 58 and/or the user interface 60 of the watercraft 10.

In step S1, the processor 25a of the digital controller 25 determines the distance to the target object (the stationary or anchored object that is selected as a reference point for anchoring). In the first embodiment, the digital controller 25 receives an estimated distance signal from the detection system (the detector 14 and the processor 25a), which first calculates the estimated current distance z(t) from the watercraft 10 to the stationary or anchored (target) object using the detection signal from the detector 14. Then, the throttle control process proceeds to step S2.

In step S2, the digital controller 25 determines whether the estimated current distance z(t) from the watercraft 10 to the stationary or anchored object is greater than the prescribed distance $Z_{des}$. If the digital controller 25 determines the estimated current distance z(t) from the watercraft 10 to the stationary or anchored object is greater than the prescribed distance $Z_{des}$, then the throttle control process proceeds to step S3. If the digital controller 25 determines the estimated current distance z(t) from the watercraft 10 to the stationary or anchored (target) object is equal to or less than the prescribed distance $Z_{des}$, then the throttle control process proceeds to step S4.

In step S3, the digital controller 25 outputs a signal to the engine control units 30 of the propulsion units 22 to provide a forward thrust from the propulsion units 22. This is accomplished by shifting the drive transmission 33 to a forward gear and changing the throttle actuator 40 to increase the opening degrees of the throttle valves of the engines 26 by a predetermined amount. Then, the throttle control process proceeds to step S4.

In step S4, the digital controller 25 determines whether the estimated current distance z(t) from the watercraft 10 to the stationary or anchored (target) object is less than the prescribed distance $Z_{des}$. If the digital controller 25 determines the estimated current distance z(t) from the watercraft 10 to the stationary or anchored (target) object is less than the prescribed distance $Z_{des}$, then the throttle control process proceeds to step S5. If the digital controller 25 determines the estimated current distance z(t) from the watercraft 10 to the stationary or anchored (target) object is equal to or greater the prescribed distance $Z_{des}$, then the throttle control process repeats step S3 until the estimated current distance z(t) from the watercraft 10 to the stationary or anchored (target) object becomes less than the prescribed distance $Z_{des}$.

In step S5, the digital controller 25 outputs a signal to the engine control units 30 of the propulsion units 22 to reverse the thrust from the propulsion units 22. This is accomplished by shifting the drive transmission 33 to a reverse gear and changing the opening degrees of the throttle valves of the engines 26 by a predetermined amount. The predetermined amount is given by the digital controller 25. Basically, for example, the predetermined amount is set to be proportional to the size of the error. Then, the throttle control process proceeds back to step S2.

In parallel to the previously discussed on-board longitudinal control system, the digital controller 25 also runs an on-board lateral control system whose sole goal is to steer the watercraft 10 to maintain the orientation of the watercraft 10 with respect to the stationary or anchored object. This lateral control system can be accomplished solely with differential steering control. However, depending on the watercraft, a rudder steering control can be used in conjunction with the differential steering control.

Figure 11:
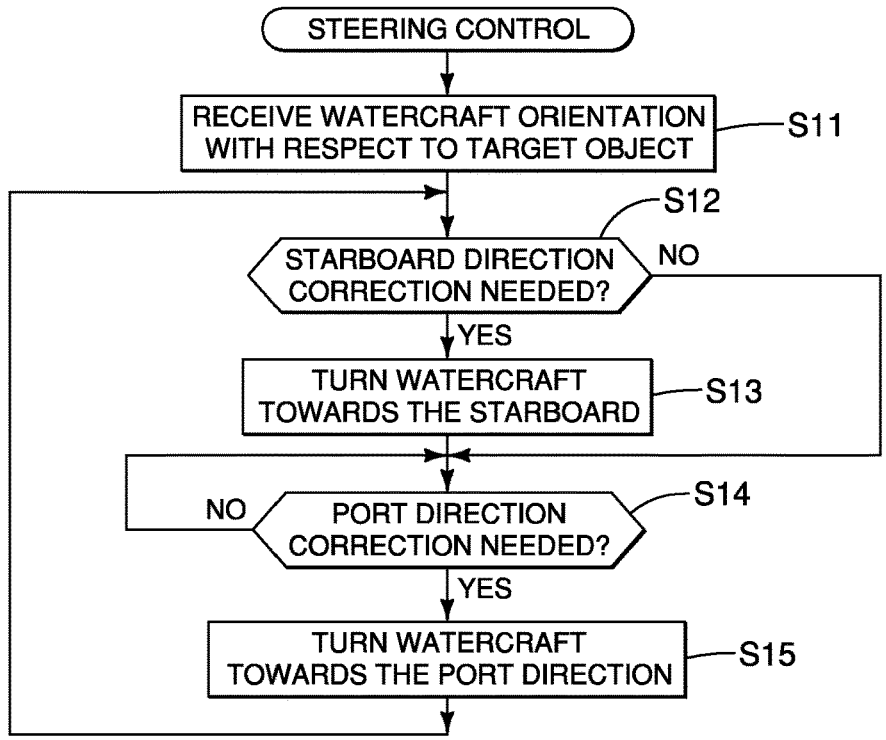
FIG. 11 is an example of a steering (lateral) control flow chart of the steering control executed by the watercraft control system during the virtual anchoring mode.

Referring now to FIG. 11, one example of a steering (lateral) control flow chart of the steering control is illustrated that is executed by the digital controller 25 of the watercraft control system 12 during the virtual anchoring mode. Here, the digital controller 25 controls the shift actuators 38, the throttle actuators 40 and/or the steering actuators 44 to turn or steer the watercraft 10 while also performing the throttle control to allow the watercraft 10 to maintain the desired orientation of the watercraft 10.

Primarily, the digital controller 25 turns the watercraft 10 using differential thrust steering. In the differential thrust steering, the digital controller 25 controls the shift actuators 38 and/or the throttle actuators 40 to turn or steer the watercraft 10 while also performing the throttle control to allow the watercraft 10 change orientation and maintain the prescribed distance $Z_{des}$. By operating the shift actuators 38, the digital controller 25 can switch between a forward thrust and a rearward thrust to effectuate a change in the propulsion direction of the propulsion units 22. Also, the propulsion direction can be changed by controlling the throttle actuators 40 such that the forward thrust is different in at least two of the propulsion units 22. The digital controller 25 can also turn the watercraft 10 using rudder control in conjunction with differential thrust steering. In rudder control, the digital controller 25 controls the steering actuators 44 to change the heading direction of the propulsion units 22. Preferably, as mentioned above, the desired orientation of the watercraft 10 is adjustable by the user using the tablet 56, the joystick 58 and/or the user interface 60 of the watercraft 10.

In step S11, the digital controller 25 receives the images from the detector 14 which indicates the estimated current heading point x(t) (the estimated current orientation or heading of the watercraft 10) with respect to the target object (the stationary or anchored object that is selected as a reference point for anchoring). Then, the steering control process proceeds to step S12.

In step S12, based on the difference between the estimated current azimuth angle of the lead watercraft W and the desired azimuth angle of the lead watercraft W, the digital controller 25 calculates the desired/target propulsion direction that is needed to maintain the orientation of the watercraft 10 with respect to the target stationary or anchored object that is selected as a reference point for anchoring. The estimated current azimuth angle can be determined from the estimated current heading point x(t) by the processor 25a of the digital controller 25. If the digital controller 25 determines that a starboard correction is needed, then the steering control process proceeds to step S13. If the digital controller 25 determines that a starboard correction is not needed, then the steering control process proceeds to step S14.

In step S13, the digital controller 25 outputs a signal to one or more of the shift actuators 38, the throttle actuators 40 and/or the steering actuators 44 to turn or steer the watercraft 10 towards the target direction computed in step S12. In other words, the digital controller 25 can use a differential steering, rudder steering, or both to turn or steer the watercraft 10 towards the target heading. Thus, the digital controller 25 determines the amount that one or more of the propulsion units 22 should be turned to the target heading and/or the amount of differential propulsion that should be generated in order to correct the orientation of the watercraft 10. Then, the steering control process proceeds to step S14.

In step S14, based on the difference between the estimated current azimuth angle of the lead watercraft W and the desired azimuth angle of the lead watercraft W, the digital controller 25 calculates the desired/target propulsion direction that is needed to maintain the orientation of the watercraft 10 with respect to the target stationary or anchored object that is selected as a reference point for anchoring. If the digital controller 25 determines that a port correction is needed, then the steering control process proceeds to step S15. If the digital controller 25 determines that a port correction is not needed, then the steering control process repeats step S14.

In step S15, the digital controller 25 outputs a signal to one or more of the shift actuators 38, the throttle actuators 40 and/or the steering actuators 44 to turn or steer the watercraft 10 towards the target direction computed in step S14. In other words, the digital controller 25 can use a differential steering, rudder steering, or both to turn or steer the watercraft 10 towards the target heading. Thus, the digital controller 25 determines the amount that one or more of the propulsion units 22 should be turned to the target heading and/or the amount of differential propulsion that should be generated in order to correct the current heading of the watercraft 10. Then, the steering control process proceeds back to step S12 to monitor when or if additional steering is needed to maintain the heading or orientation that matches the desired orientation selected by the user.

Thus, in summary, the digital controller 25 is configured to output at least one control command related to at least one of the propulsion units 22 to maintain a prescribed distance $Z_{des}$ with respect to the stationary or anchored object in accordance with the on-board longitudinal control system. Preferably, the digital controller 25 is configured to output at least one control command related to at least one of the propulsion units 22 to change a propulsion direction of the watercraft in accordance with the on-board lateral control system. Thus, the digital controller 25 controls the shift actuator 38 of the drive transmission 33 and/or the throttle actuators 40 of the engines 26 of the propulsion units 22 to maintain the prescribed distance $Z_{des}$ from the stationary or anchored object while also performing a steering control to maintain a prescribed orientation of the watercraft 10 with respect to the stationary or anchored object.

Figure 14:
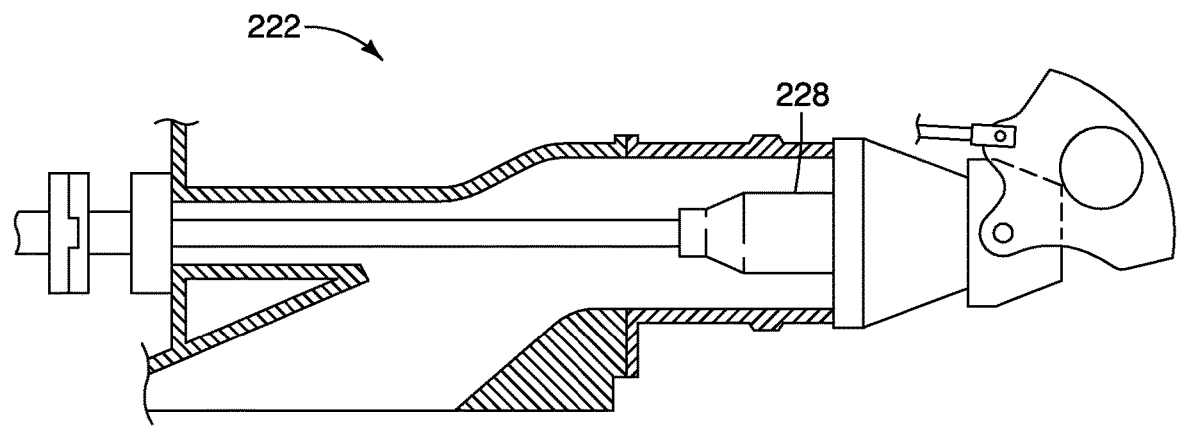
FIG. 14 is a simplified cross sectional view of one of the jet propulsion units of the host watercraft illustrated in FIGS. 12 and 13.

Referring now to FIGS. 12 to 14, a watercraft 210 is illustrated in the form of a jet propulsion boat that is equipped with a watercraft control system 212. The watercraft control system 212 is the same as the watercraft control system 12, discussed above, except that the watercraft control system 212 is adapted to a jet propulsion boat. Basically, the watercraft 210 includes a watercraft body 220 and a pair of propulsion units 222. The watercraft body 220 is provided with the propulsion units 222 in a conventional manner. The propulsion units 222 are steerable in a conventional manner. Each of the propulsion units 222 includes an engine 226 as seen in FIG. 13. Each of the engines 226 drives an impeller 228 as seen in FIG. 19 in a conventional manner. Since jet propulsion boats are well known, the watercraft 210 will not be discussed in more detail.

The watercraft control system 212 is configured to execute the virtual anchoring mode in the same way as the watercraft control system 12. Thus, the watercraft 210 is provided a detector 214 for maintaining the prescribed distance and the desired orientation of the watercraft 10 with respect to the stationary or anchored object. Like, the first embodiment, the detector 214 is a stereo camera that is used to detect a stationary or anchored object and determine a distance of the watercraft 210 from the stationary or anchored object. In this way, the watercraft control system 212 can execute the virtual anchoring mode in the same way as the watercraft control system 12 such that the watercraft 210 is effectively anchored without using an anchor or a satellite single for positioning the watercraft 210. Thus, watercraft control system 212 can maintain a prescribed distance and a desired orientation of the watercraft 210 from with respect to the stationary or anchored object.

Figure 15:
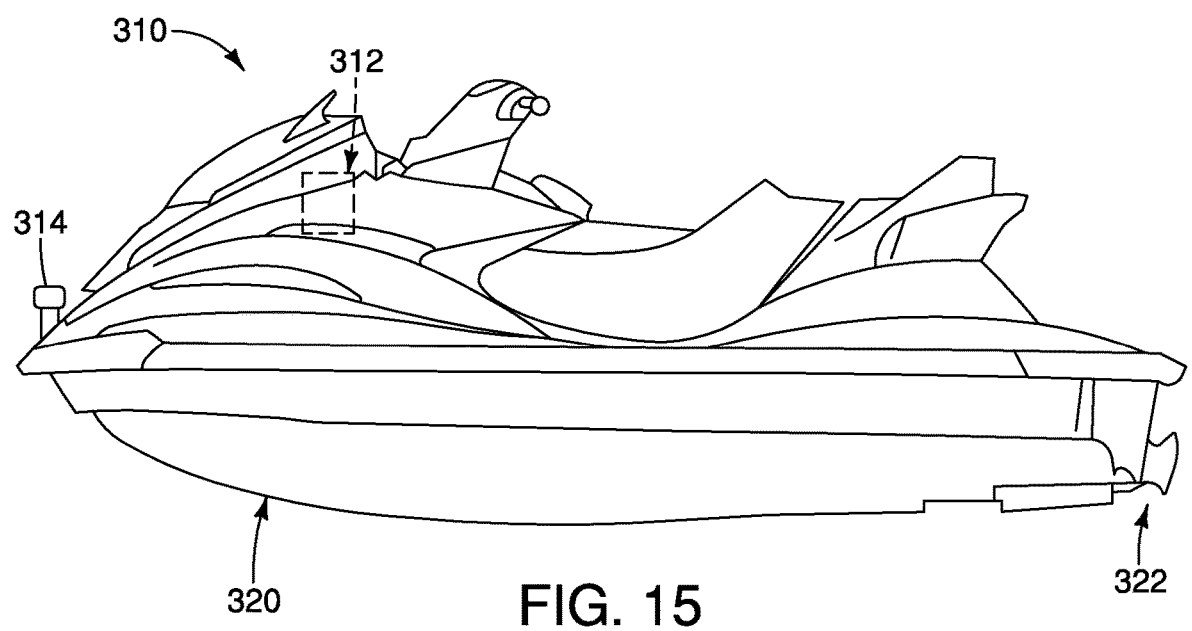
FIG. 15 is a side elevational view of a host watercraft equipped with the watercraft control system in which the host watercraft is a personal watercraft that uses jet propulsion.

Referring now to FIG. 15, a watercraft 310 is illustrated in the form of a personal watercraft that is equipped with a watercraft control system 312. The watercraft 310 is a saddle seat type of personal watercraft that is well known. The watercraft control system 312 is the same as the watercraft control system 12, discussed above, except that the watercraft control system 312 is adapted to a personal watercraft. Basically, the watercraft 310 includes a watercraft body 320 and a single propulsion unit 322. The watercraft body 320 is provided with the propulsion unit 322 in a conventional manner. The propulsion unit 322 is a jet propulsion device similar to the one illustrated in FIG. 14. The watercraft control system 312 of the watercraft 310 is configured to carry out the virtual anchoring mode in the same manner as discussed above, except that the watercraft control system 312 does not utilize the differential steering control. In other words, since the watercraft 310 only has a single propulsion unit 322, the steering control is solely carry out using rudder control. Since personal watercrafts are well known, the watercraft 310 will not be discussed in more detail.

Other than omitting differential steering control, the watercraft control system 312 is configured to execute the virtual anchoring mode in the same way as the watercraft control system 12. Thus, the watercraft 310 is provided a detector 314 for maintaining the prescribed distance and the desired orientation of the watercraft 310 with respect to the stationary or anchored object. Like, the first embodiment, the detector 314 is a stereo camera that is used to detect a stationary or anchored object and determine a distance of the watercraft 310 from the stationary or anchored object. In this way, the watercraft control system 312 can execute the virtual anchoring mode in the same way as the watercraft control system 12 such that the watercraft 310 is effectively anchored without using an anchor or a satellite single for positioning the watercraft 310. Thus, watercraft control system 312 can maintain a prescribed distance and a desired orientation of the watercraft 310 from with respect to the stationary or anchored object.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, layers, positions and/or sections, these elements, components, regions, layers, positions and/or sections should not be limited by these terms. These terms are only used to distinguish one element, component, region, layer, position or section from another element, component, region, layer, position or section. Thus, a first element, component, region, layer, position or section discussed above could be termed a second element, component, region, layer, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a watercraft floating in calm water.

The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A watercraft comprising:
   a watercraft body;
   a propulsion unit provided to the watercraft body;
   a detector configured to detect a stationary or anchored object spaced from the watercraft; and
   a digital controller configured to communicate with the detector to receive a detection signal from the detector, the digital controller configured to output at least one control command to the propulsion unit to maintain a prescribed distance between the watercraft and the stationary or anchored object such that the watercraft remains stationary with respect to the stationary or anchored object continuously during a time period from when a user input activating a virtual anchor mode is received in response to a user selecting the stationary or anchored object until a user input deactivating the virtual anchor mode is received.

2. The watercraft according to claim 1, wherein the detector includes an image recognition device.

3. The watercraft according to claim 1, further comprising an additional propulsion unit provided to the watercraft body.

4. The watercraft according to claim 3, wherein the digital controller is configured to output the at least one control command to the propulsion units to generate different propulsion forces between the propulsion units based on the detection signal from the detector.

5. A watercraft comprising
   a watercraft body;
   a propulsion unit provided to the watercraft body;
   a detector configured to detect a stationary or anchored object spaced from the watercraft;
   a digital controller configured to communicate with the detector to receive a detection signal from the detector, the digital controller configured to output at least one control command to the propulsion unit to maintain a prescribed distance between the watercraft and the stationary or anchored object; and a satellite navigation receiver connected to the digital controller, the digital controller being configured to switch control from the detection signal from the detector to a satellite position signal from the satellite navigation receiver based on the prescribed distance being greater than a prescribed threshold.

6. The watercraft according to claim 5, wherein
the detector includes an image recognition device.

7. The watercraft according to claim 5, further comprising an additional propulsion unit provided to the watercraft body.

8. The watercraft according to claim 7, wherein
the digital controller is configured to output the at least one control command to the propulsion units to generate different propulsion forces between the propulsion units based on the detection signal from the detector.

9. The watercraft according to claim 1, further comprising a steering unit provided to the watercraft body,
the digital controller being configured to output the at least one control command to the steering unit to change a propulsion direction of the watercraft.

10. A watercraft control system comprising:
a detector configured to detect a stationary or anchored object spaced from a host watercraft; and
a digital controller configured to communicate with the detector to receive a detection signal from the detector, the digital controller configured to output at least one control command to a propulsion unit of the host watercraft to maintain a prescribed distance between the host watercraft and the stationary or anchored object such that the host watercraft remains stationary with respect to the stationed or anchored object continuously during a time period from when a user input activating a virtual anchor mode is received in response to a user selecting the stationary or anchored object until a user input deactivating the virtual anchor mode is received.

11. The watercraft control system according to claim 10, wherein
the detector includes an image recognition device.

12. The watercraft control system according to claim 10, wherein
the detector includes a communication interface to communicate with an onboard computer system of the host watercraft, and
the digital controller includes a communication interface to communicate with the onboard computer system of the host watercraft.

13. The watercraft control system according to claim 10, wherein
the digital controller is configured to output the at least one control command to generate different propulsion forces based on the detection signal from the detector.

14. A watercraft control system comprising:
a detector configured to detect a stationary or anchored object spaced from a host watercraft; and
a digital controller configured to communicate with the detector to receive a detection signal from the detector, the digital controller configured to output at least one control command to a propulsion unit of the host watercraft to maintain a prescribed distance between the host watercraft and the stationary or anchored object, the digital controller being configured to switch control from the detection signal from the detector to a satellite position signal from a satellite navigation receiver based on the prescribed distance being greater than a prescribed threshold.

15. The watercraft control system according to claim 14, wherein
the detector includes an image recognition device.

16. The watercraft control system according to claim 14, wherein
the detector includes a communication interface to communicate with an onboard computer system of the host watercraft, and
the digital controller includes a communication interface to communicate with the onboard computer system of the host watercraft.

17. The watercraft control system according to claim 16, wherein
the digital controller is configured to output the at least one control command to generate different propulsion forces based on the detection signal from the detector.

18. The watercraft control system according to claim 10, wherein
the digital controller is configured to output the at least one control command to a steering unit of the host watercraft to change a propulsion direction of the watercraft.

19. A watercraft comprising:
a watercraft body;
a propulsion unit provided to the watercraft body;
a detector configured to detect a stationary or anchored object spaced from the watercraft; and
a digital controller configured to communicate with the detector to receive a detection signal from the detector, the digital controller being configured to output at least one control command to the propulsion unit to maintain both a prescribed distance between the watercraft and the stationary or anchored object and a prescribed heading of the watercraft with respect to the stationary or anchored object such that the watercraft remains stationary with respect to the stationary or anchored object continuously during a time period from when a user input activating a virtual anchor mode is received in response to a user selecting the stationary or anchored object until a user input deactivating the virtual anchor mode is received,
the digital controller being configured to select the stationary or anchored object based on a selection of the stationary or anchored object in a displayed image of an image obtained by the detector in response to an input from a user interface relative to the displayed image, and
the digital controller being configured to output the at least one control command to the propulsion unit to maintain both the prescribed distance and the prescribed heading of the watercraft such that a location of the stationary or anchored object in the displayed image is maintained at a location that is set in the displayed image according to the prescribed distance and the prescribed heading of the watercraft.

20. A watercraft control system comprising:
a detector configured to detect a stationary or anchored object spaced from a host watercraft; and a digital controller configured to communicate with the detector to receive a detection signal from the detector, the digital controller being configured to output at least one control command to a propulsion unit of the host watercraft to maintain both a prescribed distance between the host watercraft and the stationary or anchored object and a prescribed heading of the host watercraft with respect to the stationary or anchored object such that the host watercraft remains stationary with respect to the stationary or anchored object continuously during a time period from when a user input activating a virtual anchor mode is received in response to a user selecting the stationary or anchored object until a user input deactivating the virtual anchor mode is received, the digital controller being configured to select the stationary or anchored object based on a selection of the stationary or anchored object in a displayed image of an image obtained by the detector in response to an input from a user interface relative to the displayed image, and the digital controller being configured to output the at least one control command to the propulsion unit to maintain both the prescribed distance and the prescribed heading of the watercraft such that a location of the stationary or anchored object in the displayed image is maintained at a location that is set in the displayed image according to the prescribed distance and the prescribed heading of the watercraft.

* * * * *